United States Patent

Tateda

[11] Patent Number: 4,475,024
[45] Date of Patent: Oct. 2, 1984

[54] WIRELESS FOOD TEMPERATURE-SENSING ASSEMBLY

[75] Inventor: Koichi Tateda, Yao, Japan

[73] Assignee: Sharp Kabushiki Kaisha, Osaka, Japan

[21] Appl. No.: 456,669

[22] Filed: Jan. 10, 1983

Related U.S. Application Data

[63] Continuation of Ser. No. 28,839, Apr. 10, 1979, abandoned.

[30] Foreign Application Priority Data

Apr. 10, 1978 [JP] Japan .................................. 53-42462

[51] Int. Cl.³ ............................................. H05B 6/68
[52] U.S. Cl. ........................ 219/10.55 B; 219/10.55 E; 219/10.55 R; 340/870.26; 374/117; 374/149; 374/155
[58] Field of Search .................. 219/10.55 B, 10.55 R, 219/10.55 E, 10.55 F, 10.55 M; 340/870.26, 340/584, 588, 589, 596, 207 R, 210, 224, 417, 227 R, 340/228 R; 99/326, 329 R, 342; 325/37, 494, 185; 310/318; 343/6.5 SS, 6.5 R; 73/343.5; 374/117, 374/149, 155; 324/61 QL 61 P

[56] References Cited

U.S. PATENT DOCUMENTS

| | | | |
|---|---|---|---|
| 2,813,242 | 11/1957 | Crump | 325/185 |
| 3,218,638 | 11/1965 | Honig | 340/870.26 |
| 3,253,588 | 5/1966 | Vuilleumier et al. | 325/185 |
| 3,293,595 | 12/1966 | Takami | 340/870.26 |
| 3,303,701 | 2/1967 | Matsuura et al. | 324/61 QL |
| 3,355,949 | 12/1967 | Elwood et al. | 73/362 R |
| 3,434,678 | 3/1969 | Brown et al. | 325/494 X |
| 3,651,405 | 3/1972 | Whitney et al. | 99/342 |
| 4,001,798 | 1/1977 | Robinson | 310/318 |
| 4,081,645 | 3/1978 | Javes et al. | 219/10.55 B |
| 4,160,971 | 7/1979 | Jones et al. | 340/870.26 |
| 4,230,731 | 10/1980 | Tyler | 219/10.55 B X |
| 4,295,027 | 10/1981 | Zushi et al. | 219/10.55 B |
| 4,297,557 | 10/1981 | Tyler et al. | 219/10.55 R |

Primary Examiner—Roy N. Envall, Jr.
Assistant Examiner—Philip H. Leung
Attorney, Agent, or Firm—Birch, Stewart, Kolasch & Birch

[57] ABSTRACT

The present invention is directed to a cooking utensil such as a microwave oven wherein a food temperature-sensing probe is inserted into a foodstuff for detecting the internal temperature of the food. The food temperature-sensing probe includes a resonance circuit the resonance frequency of which varies depending on the internal temperature. A first signal generator is provided for delivering a series of signals which contain a variety of frequencies inclusive of the signals of the resonance frequency. A second signal generator is employed to provide sweeping signals for the series of signals developed from the first signal generator. A selecting circuit is connected to the second signal generator for selecting a particular value in the sweeping signals relevant to the desired temperature of the foodstuff. A wireless controlled circuit is provided which determines the occurance of the dip phenomena in a relationship with the particular value in the sweeping signals under the radiation of the series of signals generated from the first signal generator.

10 Claims, 4 Drawing Figures

WIRELESS FOOD TEMPERATURE-SENSING ASSEMBLY

This application as a continuation of copending application Ser. No. 28,839, filed on Apr. 10, 1979, abandoned.

BACKGROUND OF THE INVENTION

The present invention relates in general to a cooking utensil and, more particularly, to a wireless temperature-sensing assembly adapted for use in a cooking utensil such as a microwave oven.

A conventional food temperature-sensing means 13 disclosed in, for example, Fitzmayer, U.S. Pat. No. 3,974,696, issued Aug. 17, 1976, wherein a needle-like temperature sensing probe, a flexible shield cable and circuitry responsive to thermally-induced changes monitored by the probe are provided. The probe is adapted for insertion into a food being cooked. The cable is extended between the probe and the cooking cavity to connect the probe to circuitry.

As is apparent from the above patent, in the conventional food temperature-sensing means useful for a cooking utensil such as a microwave oven it is difficult to remove the cable for communicating the temperature sensing means with circitry responsive to the resultant signals detected by the sensing means. The provision of the cable has required that food be disposed in such a restricted position not to disturb operation of the cable. Especially, in a microwave oven comprising a turntable for carrying the food thereon while it is cooked, this requirement was never neglected.

OBJECTS AND SUMMARY OF THE INVENTION

Accordingly, it is the primary object of the invention to provide a novel food temperature-sensing assembly useful for a cooking utensil such as a microwave oven in which monitoring the internal temperature of food being cooked is readily carried out.

It is a further object of the invention to provide a novel food temperature-sensing assembly useful for a cooking utensil such as a microwave oven in which wireless communication is employed for monitoring the internal temperature of the food being cooked.

It is a further object of the invention to provide a novel food temperature-sensing assembly used for a cooking utensil such as a microwave oven in which resonance operations specified as the dip phenomena are utilized for monitoring the internal temperature of food being cooked, in wireless communication.

Other objects and further scope of applicability of the present invention will become apparent from the detailed descripion given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a food temperature-sensing assembly useful for a cooking utensil such as a microwave oven comprises wireless communication means for determining the internal temperature of a foodstuff positioned within the cooking utensil for cooking purposes and operation means for controlling the cooking utensil with the aid of the wireless communication means.

The wireless communication means further comprises a food temperature-sensing probe containing a resonance circuit, a first signal generator, a second signal generator, a selecting circuit and a wireless controlled circuit.

The food temperature-sensing probe is adapted for insertion into the foodstuff. The first signal generator is provided for developing a series of signals which contain a variety of frequencies inclusive of the signals of the resonance frequency for the resonance circuit. The second generator is employed to provide sweeping signals for the series of signals delivered from the first signal generator. The selecting circuit is connected to the second signal generator for selecting a particular value in the sweeping signals relevant to the desired internal temperature of the foodstuff.

The wireless controlled circuit is provided for determining the occurrence of the dip phenomena in a relationship with the particular value in the sweeping signals under the radiation of the series of signals generated from the first signal generator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
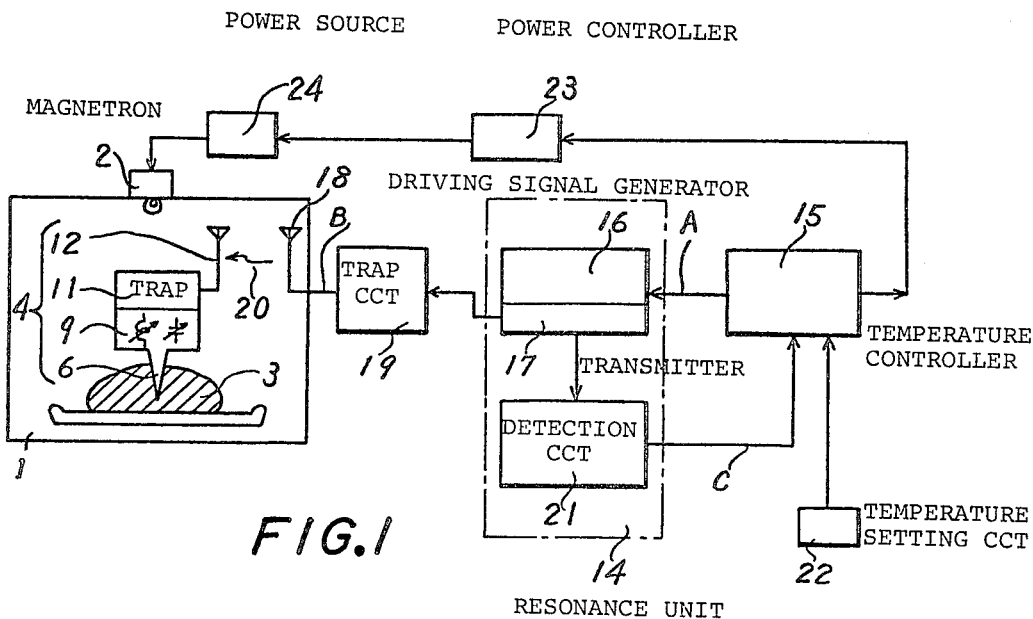
FIG. 1 is a block diagram of a wireless food temperature-sensing assembly adapted to a microwave oven according to the present invention.

FIG. 1 is a block diagram of a wireless food temperature-sensing assembly applied to a cooking utensil such as a microwave oven according to the present invention. The microwave oven with the wireless food temperature-sensing assembly comprises an oven cavity 1, a magnetron 2, a foodstuff 3, a sensor unit 4, a resonance unit 14, a temperature controller 15, a trap circuit 19, a temperature setting circuit 22, a power controller 23 and a power source 24.

The magnetron 2 generates microwave energy to cook the foodstuff 3 positioned therein with aid of the applied microwave energy which is confined within the oven cavity 1. The sensor unit 4 comprises a probe 6 which is inserted into the foodstuff 3 to monitor the internal temperature of the same. The sensor unit 4 further comprises a resonance element 9, a trap 11 and an antenna 12 described hereinafter in detail. The resonance unit 14 includes a driving signal generator 16, a transmitter 17 and a detection circuit 21.

Figure 2:
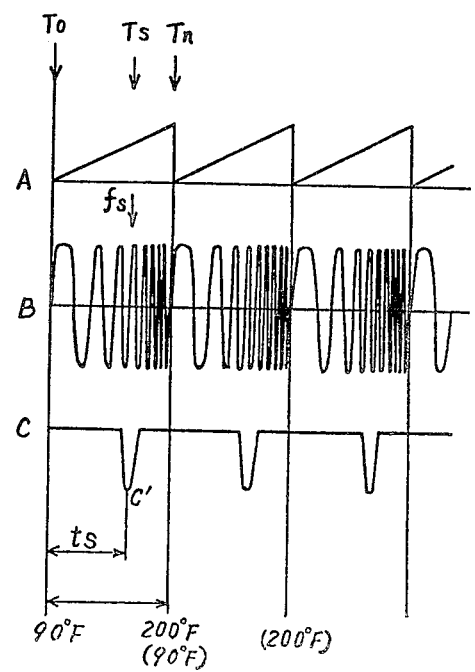
FIG. 2 is a time chart of signals occurring within the assembly shown in FIG. 1.

FIG. 2 is a time chart of various signals occurring within the wireless food temperature-sensing assembly of FIG. 1. Saw tooth signals identified by A in FIG. 1 are generated from the temperature controller 15. Using the saw tooth signals as sweep signals, the driving signal generator 16 develops driving signals denoted as B in FIG. 2 the frequency of which varies continuously and repeatedly. The transmitter 17 is provided for amplifying and holding at a predetermined level the driving signals to supply the same to an antenna 18 positioned within the oven cavity 1. The trap circuit 19 is provided for preventing the microwave energy of, say 2450 MHz, from leaking out of the oven cavity 1 through the antenna 18.

Figures 3, 4:
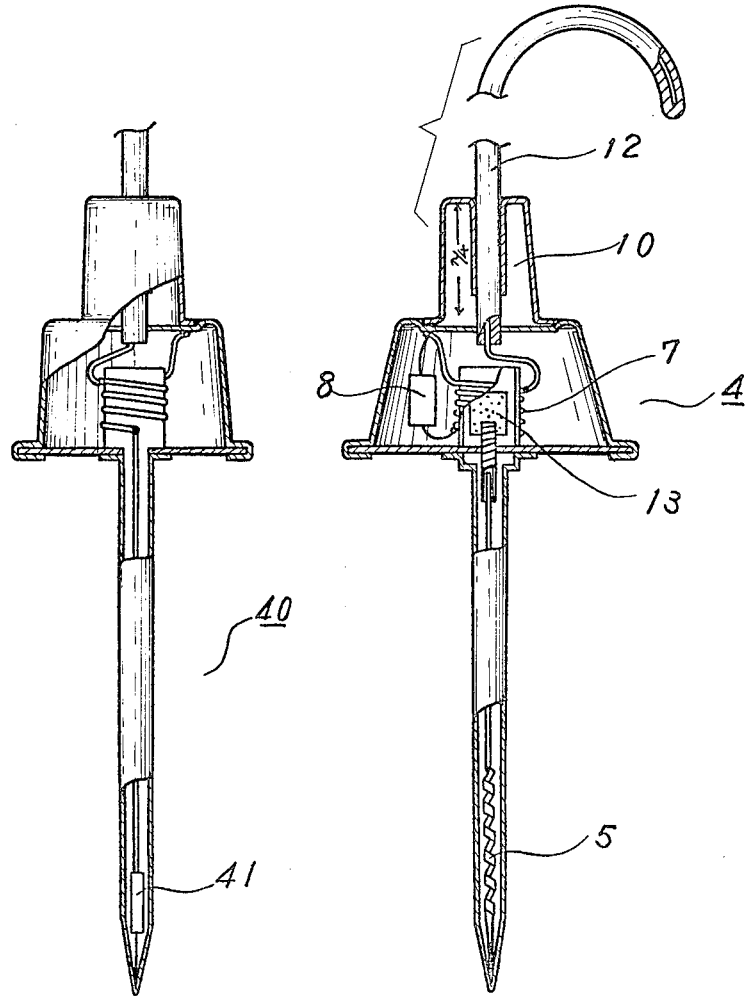
FIGS. 3 and 4 are side views with certain parts broken away of a sensor unit provided for the assembly shown in FIG. 1.

With reference to FIG. 3, there is illustrated the sensor unit 4 in detail comprising the probe 6, the resonance element 9 constructed as a resonance circuit using a coil 7 and a condenser 8, a choke 10 as the trap 11, and the antenna 12.

The probe 6 is made of a metal tube in which there is positioned a twisted bimetallic wire 5. The coil 7 is wound around a pipe made of a synthesic resin such as Bakelite. The effective electrical length of the choke 10 is equal to $\lambda/4$ where $\lambda$ is the wavelength of the microwave energy. The choke 10 is formed to prevent the microwave energy from permeating the resonance element 9.

Wireless communication of the driving signals denoted as 20 is carried out between the two antennas 12 and 20. The resonance element 9 is energized by virtue of the transmitted driving signals 20. When the probe 6 is inserted into the foodstuff 3, the bimetallic wire 5 extends and then rotates depending on an increase of the internal temperature of the foodstuff 3. It follows that a core 13 positioned within the pipe around which the coil 7 is wound is moved upward or downward to vary the inductance of the coil 7, thereby changing continuously the resonance frequency of the resonance circuit.

The housing of the sensor unit 4 is made of metal to which one terminal of the resonance element 9 is connected at ground potential. The outer of the same is connected to the antenna 12.

In operation, since the driving signals 20 have a series of frequencies which varies continuously and repeatedly in synchronization with the generation of the sweep signals as viewed in FIG. 2 although the amplitude of the driving signals 20 is constant, there is necessarily a certain frequency of the driving signals 20 (referred to B in FIG. 2) which coincides with the resonance frequency of the resonance circuit. This coincidence is determined by the occurrence of the dip phenomena identified by C' in FIG. 2. The detection circuit 21 is constructed so that it can detect the generation of the dip phenomena C'.

The resonance frequency of the resonance element 9 varies gradually on the increase depending on the increase of the internal temperature of the foodstuff 3, because the bimetallic wire 5 is lifting the core 13 upwardly with the temperature increasing. Therefore, the time when the dip phenomena occurs is gradually delayed.

The temperature controller 15 is responsive to the detection circuit 21 and the temperature setting circuit 22.

The temperature setting circuit 22 is employed to set the predetermined temperature to which the foodstuff 3 is cooked. The temperature setting circuit 22 is operated to select the value of the saw tooth wave form to set the predetermined temperature for the foodstuff 3. The temperature controller 15 is constructed so that when the dip phenomena occur at the temperature set by the temperature setting circuit 22, output signals are generated from the temperature controller 15 which are applied to the power controller 23 to prevent the magnetron 2 from receiving power supply from the power source 24. Therefore the magnetron 2 does not provide the microwave energy thereafter.

Now it is assumed that the temperature set by the temperature setting circuit 22 is identified as ts, the resonance frequency of the resonance element 9 fs and the timing Ts where the dip phenomena occur. The temperature controller 15 stores the temperature ts in the form of a selected value in the saw tooth wave form. The temperature controller 15 further comprises a determination circuit for causing the determination between the timing Ts and the point in the saw tooth sweeping signals corresponding to the temperature information ts.

In other words, the determination circuit functions to determine whether the dip phenomena are carried out in a relationship with the point in the saw tooth sweeping signals corresponding to the temperature information ts. The determination is effected in each cycle of the saw tooth sweeping signals. The determination circuit may comprise a logic circuit and the like according to the knowledge of one of the ordinally skilled in the art.

The principle of the present invention will be described in detail hereinbelow.

Since the frequency of the saw tooth sweeping signals is much smaller than the time period required to completely cook the foodstuff 3 and the temperature of the foodstuff 3 can not be considerably increased during the time period of each of frequencies of the saw tooth sweeping signals, the dip phenomena are generated only once in each cycle of the saw tooth sweeping signals.

It will be apparent that a particular resonance frequency can be defined on the basis of the specific temperature detected from the foodstuff 3. The driving signal generator 16 is constructed so that the time period when the driving signals have the signals of the particular resonance frequency is always constant. It is preliminarily identified that a specified value in the saw tooth sweeping signals is brought out in a relationship with the particular time period of the driving signals. Therfore, this specified value in the saw tooth sweeping signals can correspond to the particular temperature of the foodstuff 3. In other words, this specified value is selected to identify the particular temperature of the foodstuff 3 which is detected by virtue of the occurrence of the dip phenomena.

FIG. 4 illustrates another sensor unit 40 which is identical to that shown in FIG. 3 with the exception that a condenser 41 is used in place of the bimetallic wire 5 and the core 13. The condenser 41 is selected so that the capacitance is dependent on the temperature. As the resonance circuit of the sensor unit 40 comprises the condenser 41 and the coil, the condenser 8 can be eliminated.

Although the above-mentioned description of the preferred embodiments of the present invention is directed to a microwave oven, the principle of the present invention can be applicable to other cooking utensils such as an electric oven, a gas oven, a combined electric and microwave oven and the like according to the knowledge of those skilled in the art.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A microwave oven for varying the temperature of a foodstuff, comprising:

microwave generation means for heating said foodstuff by application of microwaves thereto;

resonance circuit means having a resonance frequency which varies in response to the temperature of said foodstuff;

first transmitter means for providing a series of driving signals inclusive of signals of the various resonance frequencies of said resonance circuit means;

second means for selecting a particular frequency of said series of driving signals corresponding to a desired set temperature of said foodstuff;

said transmitter means having a parameter which varies in response to a condition of resonance in said resonance circuit means;

third means, responsive to said second means and the variation in said parameter of said transmitter means for detecting the coincidence of said variation and a said particular driving signal frequency representative of said desired set temperature and providing an output signal in response thereto; and means responsive to said output signal for controlling said microwave generation means to heat said foodstuff to said desired set temperature.

2. The cooking utensil according to claim 1 wherein said resonance circuit is electrically connected to a probe inserted into the foodstuff to detect the internal temperature of the same, the probe comprising a thermally-responsive element.

3. The cooking utensil according to claim 2, wherein said resonance circuit means comprises an inductance element and a capacitance element and said thermally-responsive element contained within said probe includes means for varying the resonance frequency of said resonance circuit.

4. The cooking utensil according to claim 3, wherein said thermally-responsive element comprises bimetallic drive means and timing means driven thereby for varying said resonance frequency as a function of foodstuff temperature.

5. The cooking utensil according to claim 4, wherein said thermally-responsive element comprises capacitor means, the capacitance of which varies depending on the temperature, and said resonance circuit means comprises said capacitor means and an inductance element.

6. The cooking utensil according to claim 1, wherein said transmitter means comprises a wireless communication means for propagating said driving signals to said resonance circuit means.

7. The cooking utensil according to claim 6, wherein said parameter of said transmitter means is an amplitude of said driving signals which reduces in response to a resonance condition in said resonance circuit means.

8. The cooking utensil according to claim 1, wherein said second means comprises:

sweeping signal generator means for providing sweep signals of a saw tooth waveform which are applied to said transmitter means to control the frequencies of said driving signals; and setting means for selecting a particular value of said sweep signals corresponding to said desired set temperature.

9. The cooking utensil according to claim 8, wherein the cycles of said sweep signals developed from said sweeping signal generator means are much smaller than the time period when the foodstuff is cooked and said third means is operated in each cycle of said sweep signals.

10. The cooking utensil according to claim 1, wherein said parameter of said transmitter means is an amplitude of said driving signals which reduces in response to a resonance condition in said resonance circuit means.

* * * * *